United States Patent

Tvarusko

[15] 3,650,832
[45] Mar. 21, 1972

[54] ACTIVE MATERIAL ELECTRODE AND CELL COMPRISING IMPROVED BATTERY GRADE DIVALENT SILVER OXIDE

[72] Inventor: Aladar Tvarusko, Princeton, N.J.
[73] Assignee: ESB Incorporated
[22] Filed: Aug. 20, 1969
[21] Appl. No.: 851,741

Related U.S. Application Data

[63] Continuation-in-part of Ser. No. 637,643, May 11, 1967, abandoned, which is a continuation-in-part of Ser. No. 507,585, Nov. 12, 1965, abandoned, and a continuation-in-part of Ser. No. 515,497, Dec. 21, 1965, abandoned.

[52] U.S. Cl. .................................................. 136/6, 136/20
[51] Int. Cl. .................................................. H01m 35/02
[58] Field of Search .......... 136/6, 20, 30, 75, 120 R, 120 FC, 136/153, 154, 201; 252/514, 518

[56] References Cited

UNITED STATES PATENTS

| | | | |
|---|---|---|---|
| 2,994,625 | 8/1961 | Mendelsohn et al. | 136/20 |
| Re25,608 | 6/1964 | Cahan | 136/120 |
| 3,311,501 | 3/1967 | Ruetschi | 136/20 |

FOREIGN PATENTS OR APPLICATIONS

| | | | |
|---|---|---|---|
| 1,086,309 | 8/1960 | Germany | 136/154 |

OTHER PUBLICATIONS

Yoshizawa et al., Journal Electrochem Soc. Japan, Vol. 31, pp. 91– 104, 1963

*Primary Examiner*—Winston A. Douglas
*Assistant Examiner*—M. J. Andrews
*Attorney*—Alfred J. Snyder, Jr., Robert H. Robinson, Raymond L. Balfour and Joseph M. Corr

[57] ABSTRACT

Battery grade divalent silver oxide (AgO) active material containing an additive selected from mercury, selenium, tellurium and combinations of mercury with lead or tin to provide improved electrical conductivity and/or improved stability in aqueous alkaline electrolyte, without substantially adversely affecting either property. The additive is present in the divalent silver oxide active material in amounts ranging from about 0.1 to about 5 percent by weight of silver, in both ionic and metallic form, in the active material. Instead of being incorporated into the divalent silver oxide active material, the selenium, tellurium, mercury-lead and mercury-tin additives are also effective when incorporated into the alkaline electrolyte of a battery employing divalent silver oxide positive electrodes. The preferred method for incorporating the additives into the divalent silver oxide active material is by chemical coprecipitation during its preparation, though they can also be physically admixed therewith. The divalent silver oxide active material contains at least 50 percent by weight of divalent silver oxide (AgO) with the balance of the active material comprising monovalent silver oxide ($Ag_2O$) and metallic silver.

11 Claims, No Drawings

ACTIVE MATERIAL ELECTRODE AND CELL COMPRISING IMPROVED BATTERY GRADE DIVALENT SILVER OXIDE

CONTINUATION-IN-PART

This patent application is a continuation-in-part of my pending U.S. Pat. application, Ser. No. 637,643 filed May 11, 1967 and now abandoned which was a continuation-in-part application of U.S. Pat. application, Ser. No. 507,585 filed Nov. 12, 1965 and now abandoned and Ser. No. 515,497 filed Dec. 21, 1965 and now abandoned. I hereby claim priority for all subject matter disclosed in said prior applications which is also disclosed and/or claimed in this application.

BACKGROUND OF THE INVENTION

In the packaged power industry, there is an ever increasing emphasis upon the development of high capacity, small volume electric cells and batteries. The following is a comparison of some active materials currently used in commercially available cells.

| Active Material | EMF vs. Zn in Alkaline Electrolyte | Capacity ma.-hr./g. | a.-hr./cc. |
|---|---|---|---|
| HgO | 1.35 v. | 248 | 2.76 |
| $Ag_2O$ | 1.60 v. | 232 | 1.67 |
| AgO | 1.82 v. | 432 | 3.22 |

The above comparison clearly indicates that divalent silver oxide (AgO) has the highest capacity per gram or cubic centimeter and also the highest EMF. With the advancement of semiconductor technology and the increasing use of semiconductors in electronic devices, there is greater than ever need for high capacity, small volume packaged power sources having high voltages.

As shown by the preceding table, divalent silver oxide is an excellent high capacity battery active material having a relatively high EMF, but unfortunately, it has two properties which have limited its use as a battery active material. In preparing the divalent silver oxide active material, not all of the silver metal can be converted to divalent silver oxide, and therefore, some of the divalent silver oxide active material contains monovalent silver oxide ($Ag_2O$) which has a relatively high electrical resistance. During the discharge of a battery employing a divalent silver oxide positive active material, additional monovalent silver oxide is formed and the internal resistance of the battery increases. Since this seriously limits the use of cells or batteries having divalent silver oxide positive active material, it is desirable to have a maximum amount of divalent silver oxide present in the active material and to reduce the electrical resistivity of the divalent silver oxide active material to a minimum.

Another problem encountered when using divalent silver oxide as the positive active material is its lack of stability when in contact with aqueous alkaline solutions. It is well known that divalent silver oxide evolves oxygen when in contact with aqueous alkaline solutions, and this gassing phenomenon causes self-discharge of the divalent silver oxide, converting it to monovalent silver oxide or metallic silver. As a result of this lack of stability in aqueous solutions, divalent silver oxide active material cannot be used in hermetically sealed cells and batteries because of the hazard of pressure build-up and possible explosion.

The properties of divalent silver oxide active material have been studied by many persons skilled in the battery art, and of particular pertinence to this invention is an article entitled "Electrode Phenomena of Silver-Silver Oxide System in Alkaline Batteries" by Shiro Yoshizawa and Zenichiro Takehara published in the Journal of the Electrochemical Society of Japan, Volume 31, No. 3, pages 91–104(1963). In this article, the effects of various metallic additives on silver electrodes is reported. Among the additives studied by the Japanese were lead, tin, antimony, indium, cadmium, tellurium, gold, copper and bismuth. In the Japanese experiments, these additives were incorporated into silver powder which was subsequently oxidized electrochemically in an alkaline solution to form divalent silver oxide active material. The Japanese reported that when the electrodes to which tellurium and antimony had been added were oxidized, the current efficiency for the formation of AgO was decreased, resulting from the lowering of the oxygen overpotential by the additives, and therefore, oxygen was evolved during the second step of charge resulting in a substantially reduced amount of divalent silver oxide being formed in the active material.

SUMMARY OF THE INVENTION

It is the general object of this invention to provide battery grade divalent silver oxide (AgO) active material having improved stability in aqueous alkaline electrolyte and/or improved electrical conductivity by incorporating metallic additives therein. It is essential to this invention that a principal amount of the active material comprise divalent silver oxide (i.e., at least 50 percent) so as to improve the electrical conductivity of the active material and to provide a battery active material having a higher capacity than mercuric oxide or monovalent silver oxide battery active materials. Other objects and advantages of the invention may be determined from the description which follows.

It has been discovered that divalent silver oxide (AgO) active material containing a metallic additive selected from mercury, selenium and tellurium has improved electrical conductivity and/or improved stability in aqueous alkaline electrolyte, without substantially adversely affecting either property. In addition, combinations of mercury with lead or tin provide particular improvement in the electrical conductivity of divalent silver oxide. It is generally preferred to incorporate the metallic additive in amounts ranging from about 0.1 to about 5 percent by weight of silver, in both ionic and metallic form, present in the divalent silver oxide active material.

The metallic additives may be physically admixed into the divalent silver oxide active material, though it is particularly preferred to incorporate the metallic additives by coprecipitating them with divalent silver oxide during its preparation. It is essential that the divalent silver oxide active material contain at least about 50 percent divalent silver oxide, and it has been found that coprecipitation of the additives during the preparation of the active material does not substantially adversely affect the yield of divalent silver oxide in the active material. It has also been found that the uniform and intimate distribution of the additives in the active material achieved by the coprecipitation method increases their effectiveness. Instead of being incorporated into the divalent silver oxide active material, the selenium, tellurium, mercury-lead and mercury-tin additives are also effective when incorporated into the alkaline electrolyte of a battery employing divalent silver oxide positive electrodes.

DETAILED DESCRIPTION

It has been discovered that certain metallic additives, when incorporated into divalent silver oxide battery active material, will reduce the electrical resistivity of the divalent silver oxide active material, i.e., improve its conductivity, or improve its stability in aqueous alkaline electrolyte without substantially adversely affecting either property. It is preferred to incorporate the additives into the divalent silver oxide active material by chemical coprecipitation during its preparation, but they can also be physically admixed with the divalent silver oxide active material. It has been found that certain of the additives are also effective when incorporated into the alkaline electrolyte of batteries employing divalent silver oxide positive electrodes, in which case the additives can be omitted from the divalent silver oxide active material.

After extensive tests, it has been determined that mercury improves the electrical conductivity of divalent silver oxide active material, and selenium and tellurium improve the stability of divalent silver oxide active material in aqueous alkaline electrolyte. In addition to improving the electrical conductivity, the mercury additive does not substantially adversely affect the stability of the divalent silver oxide active material, and in like manner, the selenium and tellurium additives do not substantially adversely affect the conductivity.

It has also been found that combinations of the mercury additive with lead or tin improve both electrical conductivity and the stability of divalent silver oxide active material in aqueous alkaline electrolyte, with particular improvement in the electrical conductivity. This was quite unexpected, for the mercury alone slightly impaired the stability of the divalent silver oxide active material, and the improvement in the electrical conductivity was greater than when the components of the coadditives were used separately.

Since an object of this invention is to provide a divalent silver oxide active material having improved conductivity, it is essential that the active material contain at least 50 percent by weight of divalent silver oxide (AgO) with the balance of the active material comprising monovalent silver oxide ($Ag_2O$) and metallic silver. As previously indicated, the monovalent silver oxide has relatively high electrical resistance, and therefore, it is important to keep the monovalent silver oxide content to a minimum. Another reason for keeping the monovalent silver oxide content to a minimum is the fact that it has much less capacity per unit weight than divalent silver oxide. It is particularly preferred that at least about 90 percent of the active material be AgO. As shown in the preceding chart, the capacity of monovalent silver oxide is approximately 232 ma.-hr./g. whereas the capacity of divalent silver oxide is 432 ma.-hr./g.

The divalent silver oxide active material of this invention should have a capacity of at least 300 ma.-hr./g. and it is preferred that the capacity be at least 350 ma.-hr./g.

The divalent silver oxide active material is preferably prepared by the persulfate oxidation of a silver salt, such as silver nitrate, in alkaline solution. The equation of the reaction is written as follows:

$$4AgNO_3 + 2K_2S_2O_8 + 8NaOH \longrightarrow 4AgO + K_2SO_4 + 3Na_2SO_4 + 2NaNO_3 + 2KNO_3 + 4H_2O$$

This method for preparing divalent silver oxide is reported by Robert N. Hammer and Jacob Kleinberg in *Inorganic Synthesis*, Vol. IV, pp. 12–14, McGraw-Hill Book Co., New York (1953). The procedure is reported as follows.

72 g. of NaOH in pellet form is added in portions, with constant stirring, 1 liter of water, which is maintained at approximately 85° C. 75g. of $K_2S_2O_8$ in the form of an aqueous slurry is added to the hot alkaline solution; this is followed by the addition of 51 g. of silver nitrate dissolved in a minimum amount of water. The temperature of the resulting mixture is raised to 90° C. and stirring is continued for approximately 15 minutes.

The precipitate of black divalent silver oxide is filtered on a large Buchner funnel and sulfate ion is removed by washing with water which is made slightly alkaline with sodium hydroxide. The product is air dried with a yield of 35 g (94 percent).

Another feature of this invention is that it has been found to be advantageous to incorporate the metallic additives into the divalent silver oxide active material during its chemical preparation, i.e., oxidation of aqueous silver nitrate solution by alkaline persulfate. The preferred method for adding a metallic element to the AgO is to add its nitrate salt to the aqueous silver nitrate solution before chemical oxidation. If the nitrate salt of the metallic additive is not available, or cannot be used because of hydrolysis, the metallic element can be added as an anion in the form of the potassium or sodium salt if one is available. If there is a reaction between the silver ion and said anion, the metallic element in anion form can be added to the aqueous alkaline persulfate solution directly, or dissolved first in the NaOH solution. The metallic additives included within the scope of this invention can be added as follows:

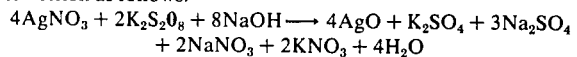

| Additive Salt | Added to: |
|---|---|
| $H_2SeO_3$ | $K_2S_2O_8$ - NaOH solution |
| $Hg(NO_3)_2$ | $AgNO_3$ solution |
| $Na_2SnO_3$ | $K_2S_2O_8$ - NaOH solution |
| $Na_2TeO_3$ | $K_2S_2O_8$ - NaOH solution |
| $Pb(NO_3)_2$ | $AgNO_3$ solution |

This method for incorporating the additives into the divalent silver oxide active material provides a uniform distribution of the additive throughout the AgO.

In addition to incorporating the additive by chemical coprecipitation, it may also be added to the divalent silver oxide by physically admixing it with AgO. Those additives which improve the stability of the divalent silver oxide (selenium, tellurium, mercury-lead and mercury-tin) are also effective when added to the battery electrolyte instead of the divalent silver oxide active material.

In order to provide divalent silver oxide active material in accordance with this invention, the metallic additives may be incorporated in amounts ranging from about 0.1 to about 5 percent by weight of silver, in both ionic and metallic form, in the divalent silver oxide active material. In the case of the mercury-lead and mercury-tin coadditives, the total of both metallic additives should fall within this range of about 0.1 to about 5 percent. Though the additives are generally effective for improving the stability or conductivity when present in amounts ranging from about 0.1 to about 5 percent by weight of silver, they may adversely affect one of these two properties when present in relatively large amounts, even amounts within the 0.1–5 percent range (e.g. 5percent). When using the coprecipitation method for addition of the additives, smaller amounts of additive may be used because the uniform distribution of the additive in the divalent silver oxide active material enhances its effectiveness. When using this method of preparation, the amount of additive can be based on the weight of silver ion used in the preparation of the divalent silver oxide active material.

The following examples illustrate the preparation of divalent silver oxide containing metallic additives and the improved conductivity and stability achieved thereby in accordance with this invention.

EXAMPLE I slurry. Hg(NO 102 g. of $AgNO_3$ was dissolved in 85 ml. to form a $AgNO_3$ solution, and 150 g. of $K_2S_2O_8$ was added to 60 ml. of water to form a $K_2S_2O_8$ slurry. $Hg(nO_3)_2$ was dissolved in the $AgNO_3$ solution in amount sufficient to provide 1 percent by weight of Hg ion per weight of Ag ion. 2,000 ml. of water was placed in a container and it was heated and agitated by a mechanical stirrer. When the water temperature reached about 60° C., 144 g. of NaOH pellets was added in several small portions to form an alkaline solution.

After the alkaline solution reached a temperature of 85° C., it was maintained at this temperature with continued agitation. The $K_2S_2O_8$ slurry was added to the alkaline solution in small portions, and thereafter, the $AgNO_3$ solution containing Hg ions was very slowly added to the alkaline solution containing $K_2S_2O_8$. The temperature of the reaction solution was permitted to rise to 90° C. The reaction solution was agitated at 90° C. for 15 minutes to complete the oxidation of the silver ions to divalent silver oxide.

After the reaction, the supernatant liquid and then the precipitate was filtered on a Buchner funnel. The filtrate was thoroughly washed with slightly alkaline wash water (3g. of NaOH/gal.). The AgO filter cake was removed from the funnel and placed in a vacuum oven and was dried for 16 hours at about 60° C. The dried AgO weighed 72 g. equivalent to a yield of 95 percent.

The AgO active material was chemically analyzed to determine its silver, $Hg^{++}$ and AgO content. The total silver content was 82.6 percent by weight and the $Hg^{115}$ content was 0.8 percent. The active oxygen content was determined iodimetrically, and from this value the AgO content was calculated to be 96.2 percent by weight of the active material. The AgO active material was tested for its electric resistivity and was compared to AgO active material which contained no $Hg^{115}$. The electric resistivity was pressure dependent, but as the pressure increased, the variance of the resistivity decreased. Therefore, the resistivity was determined at 30,700 p.s.i. with a model 503 Keithley Instrument milliohmmeter. The results were as follows:

| Sample | El. Resistivity (ohm-cm.) |
|---|---|
| AgO | 64.0 |
| AgO + $Hg^{++}$ | 3.84 |

The mercury additive provided a totally unexpected improvement in the conductivity of the divalent silver oxide active material.

EXAMPLE II

AgO containing tellurium was prepared in accordance with the procedure set forth in Example I except for the method of incorporating the additive. The following chart indicates the metallic salt which was added to the AgO during its preparation and the solution in which the salt was added to the reaction solution:

| Additive Salt | Added to: |
|---|---|
| $Na_2TeO_3$ | $K_2S_2O_8$ - Na OH solution |

The additive salt was added in amount sufficient to provide 1 percent by weight of the tellurium per weight of silver ion in the gO. The active oxygen content o the AgO active material was determined iodimetrically, and from this value it was calculated that the AgO content was 93.3 percent by weight of the active material. The AgO active material containing the tellurium was compared to AgO containing no additive and tested for both stability and electric resistivity. The resistivity was again measured at 30,700 p.s.i. The stability was determined at 100° F. in the following electrolyte:

|  | Parts by Weight |
|---|---|
| Na OH | 48 |
| ZnO | 10 |
| $H_2O$ | 100 |

These tests yielded the following results:

| Additive | El. Resistivity (ohm-cm.) | Gassing Rate (microliter/g. AgO/day) |
|---|---|---|
| None | 64.0 | 280 |
| Te | 69.3 | 100 |

The Te greatly improved the stability and had only a slight adverse effect on resistivity.

EXAMPLE III

HgO was ball milled with AgO to determine whether physical mixtures of a metallic element and AgO have improved electric resistivity. The HgO AND AgO were ball milled for 5 minutes with 3 balls in a Minimill. The results were as follows:

| Additive | Additive (Wt.%) | El. Resistivity (ohm-cm.) |
|---|---|---|
| None | — | 64.0 |
| HgO | 1 | 58.4 |
| HgO | 5 | 60.3 |

There was some improvement but not as great as when the Hg is coprecipitated with AgO. One explanation for the poorer results is that the ball milling adversely affected the AgO.

EXAMPLE IV

The tellurium additive was also tested by incorporating it in the electrolyte in which AgO active material was placed, with the following results:

| Additive | Added as | Amount of additive (%wt. Ag) | Gassing Rate (microliter/g. AgO/day) |
|---|---|---|---|
| None | — | — | 249 |
| Te | $Na_2TeO_3$ | 1% | 106 |

Again, the tellurium additive provided a substantial improvement in the stability of the AgO.

EXAMPLE V 102 g. of $AgNO_3$ was dissolved in 85 ml. to form a $AgNO_3$ solution, and 150 g. of $K_2S_2O_8$ was added to 60 ml. of water to form a $K_2S_2O_8$ slurry. $Hg(NO_3)_2$ and $Pb(NO_3)_2$ were dissolved in the $AgNO_3$ solution in amount sufficient to provide 0.5 percent by weight of Hg ion and 0.5 percent by weight of Pb ion per weight of Ag ion. 2000 mo. of water was placed in a container and it was heated and agitated by a mechanical stirrer. When the water temperature reached about 60° C., 144 g. of Na OH pellets was added in several small portions to form an alkaline solution.

After the alkaline solution reached a temperature of 85° C., it was maintained at this temperature with continued agitation The $K_2S_2O_8$ slurry was added to the alkaline solution in small portions, and thereafter, the $AgNO_3$ solution containing Hg and pb ions was very slowly added to the alkaline solution containing $K_{2l\ s2}O_8$. The temperature of the reaction solution was permitted to rise to 90° C. The reaction solution was agitated at 90° C. for 15 minutes to complete the oxidation of the silver ions to divalent silver oxide.

After the reaction, the supernatant liquid and then the precipitate was filtered on a Buchner funnel. The filtrate was thoroughy washed with slightly alkaline wash water (3g. of NaOH/gal.). The AgO filter cake was removed from the funnel and placed in a vacuum oven and was dried for 16 hours at about 60° C. The dried AgO weighed 72 g. equivalent to a yield of 95 percent.

The AgO containing about 0.5 percent of Hg ion and 0.5 percent of Pb ion per weight of silver ion was tested for its electric resistivity and stability and was compared to AgO which contained no Hg ion. The electric resistivity of the AgO active material was found to be dependent on pressure, but as the pressure increased the variance of the resistivity decreased. Therefore, the electric resistivity was determined at 30,700 p.s.i. with a model 503 Keithley Instrument milliohmmeter. The stability was determined at 100° F. in the following electrolyte:

|  | Parts by Weight |
|---|---|
| NaOH | 48 |
| ZnO | 10 |
| $H_2O$ | 100 |

The results were as follows:

| Sample | El. Resistivity (ohm-cm.) | Gassing Rate (microliters/g. AgO/day) |
|---|---|---|
| AgO | 64 | 280 |
| AgO+$Hg^{++}$+$Pb^{++}$ | 1.77 | 122 |

The mercury and lead coadditive provided an exceptional improvement in both the conductivity and stability of the divalent silver oxide.

EXAMPLE VI

AgO containing mercury-lead and mercury-tin coadditives was prepared in accordance with the procedure set forth in Example I except for the method of incorporating the coadditive. The following chart indicates the metallic salt which was added to the GO during its preparation and the solution in which the salt was added to the reaction solution:

| Additive Salt | Added to: |
|---|---|
| $Pb(NO_3)_2$ | $AgNO_3$ solution |
| $Hg(NO_3)_2$ | $AgNO_3$ solution |
| $Na_2SnO_3$ | $K_2S_2O_8$ = NaOH solution |

The coadditive salts were added in amount sufficient to provide 0.1 percent by weight of silver ion in the AgO. The AgO active material containing the coadditives wad compared to AgO containing the additives individually and tested for electric resistivity. The resistivity was again measured at 30,700 p.s.i. These tests yielded the following results:

| Additive | Amount (% by wt. of Ag) | El. Resistivity (ohm-cm.) |
|---|---|---|
| Pb | 0.1 | 6.95 |
| Hg | 0.1 | 9.12 |
| Sn | 0.1 | 10.7 |
| No Additive | — | 64.0 |
| Pb-Hg | 0.05-0.05 | 5.58 |
| Hg-Sn | 0.05-0.05 | 7.87 |

The above results demonstrate a definite synergistic improvement achieved by using a coadditive instead of each metallic element individually.

EXAMPLE VII

A lead-mercury coadditive was incorporated in the electrolyte in which the AgO was tested for stability. The lead and mercury were added in equal amounts in the form of PbO and HgO AND THE TOTAL AMOUNT OF LEAD AND MERCURY IONS WAS - PERCENT BY WEIGHT OF SILVER ION IN THE DIVALENT SILVER OXIDE. The coadditive was compared to lead and mercury alone with the following results:

| Additive | Added As | Amount | Gassing Rate (microliter/g. AgO/day) |
|---|---|---|---|
| None | — | — | 249 |
| Hg | HgO | 1.01% | 292 |
| Pb | PbO | 1.0% | 105 |
| Pb-Hg | PbO-HgO | 0.5-0.5% | 98 |

The synergistic effect of the lead-mercury combination is apparent.

EXAMPLE VIII

Divalent silver oxide active material containing selenium was prepared in accordance with the procedure set forth in Example I except for the method of incorporating the selenium additive. Selenium was added as selenious acid, $H_2SeO_3$, to the alkaline persulfate solution before the addition of silver nitrate. The selenium was added in an amount of 0.1 percent by weight of silver present in the active material. The active oxygen content of the AgO active material was determined iodimetrically, and from this value it was calculated that the AgO content of the active material was 97.6 percent by weight. The electrical resistivity and the gassing rate of the divalent silver oxide active material containing the selenium additive were as follows:

| El. Resistivity (ohm-cm.) | Gassing Rate (microliter/g. AgO/day) |
|---|---|
| 58.1 | 17 |

It should be noted that the divalent silver oxide active material used in this example was exceptionally pure and when no additive was present had an electrical resistivity ranging from 50 to 60 ohm-cm. and a gassing rate of about 20 microliters per gram per day. The selenium additive slightly improved the stability of the divalent silver oxide active material.

Having completely described this invention, I claim:

1. A divalent silver oxide battery active material containing at least 50 percent by weight of divalent silver oxide (AgO) with the balance of the active material comprising monovalent silver oxide ($Ag_2O$) and metallic silver, said divalent silver oxide active material containing an additive selected from mercury, selenium, tellurium, mercury-lead and mercury-tin in amounts ranging from about 0.1 to about 5 percent by weight of silver in both ionic and metallic form in the active material.

2. A divalent silver oxide battery active material in accordance with claim 1 in which the additive is mercury.

3. A divalent silver oxide battery active material in accordance with claim 1 in which the additive is tellurium.

4. A divalent silver oxide battery active material in accordance with claim 1 in which the additive is mercury-lead.

5. A divalent silver oxide battery active material in accordance with claim 1 in which the additive is mercury-tin.

6. A divalent silver oxide battery active material in accordance with claim 1 in which the divalent silver oxide (AgO) comprises at least about 90 percent by weight of the active material.

7. In an alkaline battery having a negative electrode, and alkaline electrolyte and a divalent silver oxide positive electrode having a divalent silver oxide (AgO) active material content of at least 50 percent by weight with the balance of the divalent silver oxide active material comprising monovalent silver oxide and metallic silver, the improvement which comprises said divalent silver oxide active material containing an additive selected from mercury, selenium tellurium, mercury-lead and mercury-tin in amounts ranging from about 0.1 to about 5 percent by weight of silver in both ionic and metallic form in the active material.

8. In an alkaline battery in accordance with claim 7 in which the divalent silver oxide (AgO) content of the positive electrode active material comprises at least about 90 percent by weight of the active material.

9. In an alkaline battery having a negative electrode, a divalent silver oxide positive electrode and an alkaline electrolyte, the improvement which comprises said alkaline electrolyte containing an additive selected from selenium, tellurium, mercury-lead and mercury-tin in amounts ranging from about 0.1 to about 5 percent by weight of silver in both ionic and metallic form in the positive electrode active material.

10. In an alkaline battery in accordance with claim 9 in which the additive is tellurium.

11. In an alkaline battery in accordance with claim 9 in which the additive is mercury-lead.

* * * * *